US012411699B2

(12) United States Patent
Jacob et al.

(10) Patent No.: US 12,411,699 B2
(45) Date of Patent: Sep. 9, 2025

(54) DYNAMIC GENERATION OF USER INTERFACE CONTROLS

(71) Applicant: Shopify Inc., Ottawa (CA)

(72) Inventors: Rohit Jacob, Ottawa (CA); Ranjodh Singh, Ottawa (CA)

(73) Assignee: Shopify Inc., Ottowa (CA)

( * ) Notice: Subject to any disclaimer, the term of this patent is extended or adjusted under 35 U.S.C. 154(b) by 0 days.

(21) Appl. No.: 18/338,130

(22) Filed: Jun. 20, 2023

(65) Prior Publication Data
US 2024/0362036 A1 Oct. 31, 2024

Related U.S. Application Data

(60) Provisional application No. 63/499,150, filed on Apr. 28, 2023.

(51) Int. Cl.
G06F 9/451 (2018.01)
G06F 3/0481 (2022.01)
G06N 20/00 (2019.01)

(52) U.S. Cl.
CPC ............ G06F 9/451 (2018.02); G06F 3/0481 (2013.01); G06N 20/00 (2019.01)

(58) Field of Classification Search
CPC ........ G06F 9/451; G06F 3/0481; G06N 20/00
See application file for complete search history.

(56) References Cited

U.S. PATENT DOCUMENTS

| 7,856,441 | B1* | 12/2010 | Kraft | G06F 16/951 |
| | | | | 707/758 |
| 7,958,115 | B2* | 6/2011 | Kraft | G06F 16/9535 |
| | | | | 707/723 |
| 11,010,691 | B1* | 5/2021 | Chen | G06N 20/00 |
| 11,269,871 | B1* | 3/2022 | Bigdelu | G06F 16/252 |
| 11,636,128 | B1* | 4/2023 | Bigdelu | G06F 16/2428 |
| | | | | 707/722 |
| 11,755,594 | B1* | 9/2023 | Iyer | H04L 67/535 |
| | | | | 707/722 |
| 11,947,590 | B1* | 4/2024 | Chakraborty | G06F 16/54 |
| 12,008,054 | B2* | 6/2024 | Chembolu | G06N 3/08 |
| 12,093,308 | B2* | 9/2024 | Faieta | G06N 3/08 |
| 12,182,913 | B2* | 12/2024 | Sil | G06T 11/60 |
| 12,315,052 | B2* | 5/2025 | Bera | G06F 40/30 |
| 2013/0124529 | A1* | 5/2013 | Jacob | G06F 9/44505 |
| | | | | 707/E17.089 |
| 2015/0169285 | A1 | 6/2015 | Reyes et al. | |
| 2019/0354802 | A1* | 11/2019 | Lin | G06F 18/22 |
| 2020/0097247 | A1 | 3/2020 | Molina et al. | |
| 2020/0125574 | A1 | 4/2020 | Ghoshal et al. | |

(Continued)

OTHER PUBLICATIONS

International Search Report and Written Opinion on PCT App. PCT/CA2024/050211 dated Apr. 25, 2024 (10 pages).

Primary Examiner — Tadesse Hailu
(74) Attorney, Agent, or Firm — Foley & Lardner LLP

(57) ABSTRACT

Disclosed here are methods and systems for dynamically generating user interface controls. In one embodiment, a method comprises receiving, via a search input element, an input; generating an input vector corresponding to the input; identifying a set of user interface controls matching the input, the identifying including comparing the input vector to a set of user interface control vectors; and providing the matching set of interactive user interface controls for presentation on a single user interface page.

20 Claims, 9 Drawing Sheets

(56) References Cited

U.S. PATENT DOCUMENTS

| | | | |
|---|---|---|---|
| 2020/0312298 A1* | 10/2020 | Bui | G06F 3/167 |
| 2020/0349180 A1* | 11/2020 | Kempf | G06F 16/367 |
| 2020/0356591 A1* | 11/2020 | Yada | G06F 3/04855 |
| 2021/0019309 A1* | 1/2021 | Yadav | G06F 16/2428 |
| 2021/0224306 A1* | 7/2021 | Choudhary | G06Q 30/0281 |
| 2022/0222260 A1* | 7/2022 | Lin | G06F 16/248 |
| 2022/0222875 A1* | 7/2022 | Gupta | G06T 11/20 |
| 2023/0316368 A1* | 10/2023 | Itaenen | G06T 7/90 382/165 |
| 2024/0054552 A1* | 2/2024 | Fu | G06Q 30/0641 |
| 2024/0211477 A1* | 6/2024 | Gampa | G06N 3/084 |

\* cited by examiner

FIG. 4

DYNAMIC GENERATION OF USER INTERFACE CONTROLS

CROSS-REFERENCE TO RELATED APPLICATIONS

This application claims priority to U.S. Provisional Patent Application No. 63/499,150, filed Apr. 28, 2023, which is incorporated herein by reference in its entirety for all purposes.

TECHNICAL FIELD

This application relates generally to dynamic generation of different elements, such as user interface controls and input elements configured to adjust user interfaces.

BACKGROUND

A user wishing to make changes to a system configuration or revise a user interface must first find the relevant setting page and/or user interface controls configured to revise relevant parameters within a settings user interface menu. Conventionally, this process is typically performed using a conventional search bar, which is inefficient.

BRIEF DESCRIPTION OF THE DRAWINGS

The accompanying drawings constitute a part of this specification and illustrate embodiments of the subject matter disclosed herein.

FIG. 4 shows a home page of an administrator, according to an embodiment.

DETAILED DESCRIPTION

Figure 1A:
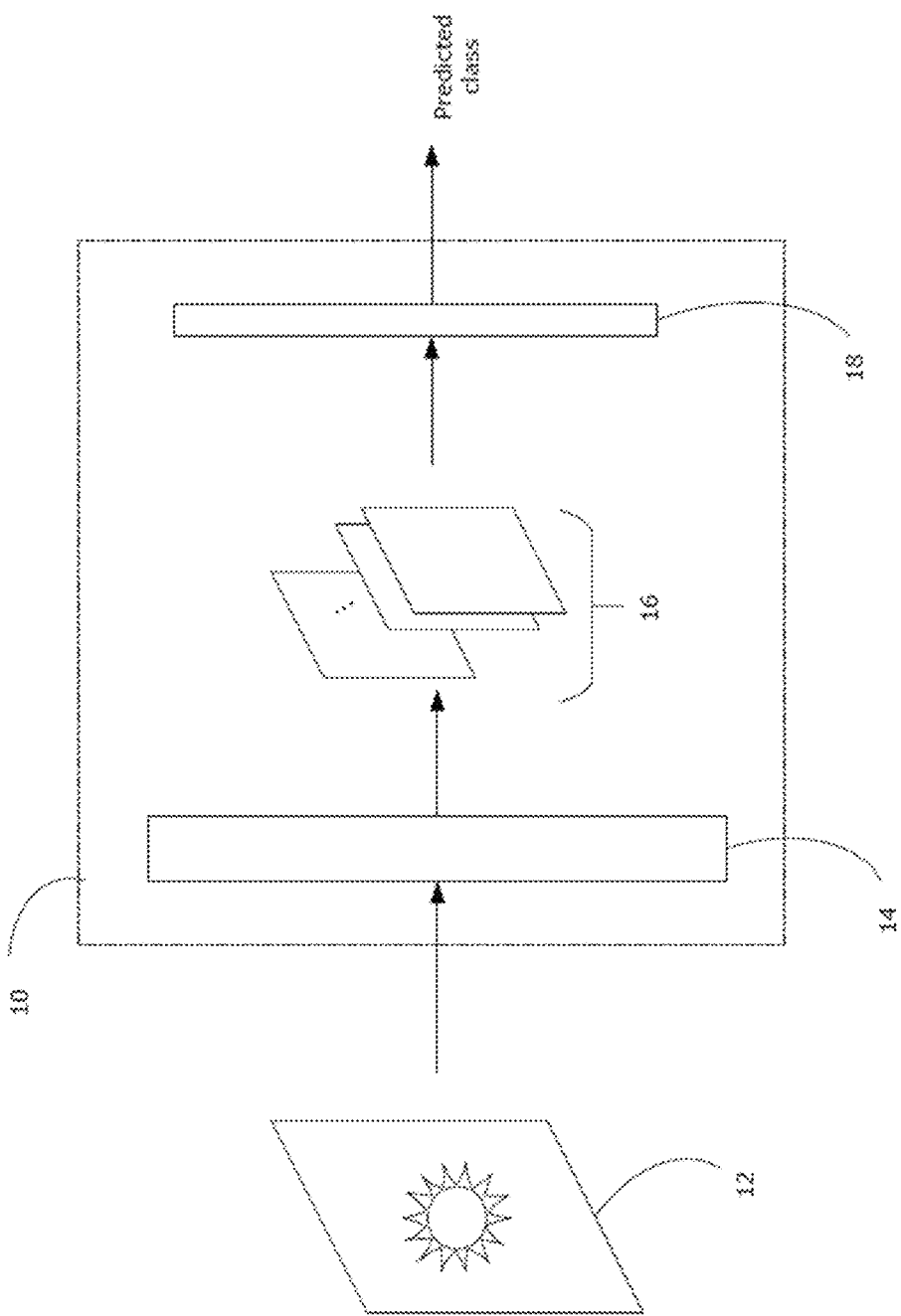
FIG. 1A is a block diagram of a simplified convolutional neural network, which may be used in examples of the present disclosure.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Using the methods and systems discussed herein, a server (e.g., analytics server or other computing device discussed herein) can provide a user interface having an input element, such as a search bar, where users can use natural language to enter their desired revisions, such as revisions to a user interface and/or system configurations. The analytics server may then use various analytical methods, such as artificial intelligence modeling techniques, to identify/infer one or more user interface controls associated with the input received from the user, as the desired user interface control may not be a direct match of the text used to label that user interface control. As a response to the search query, the analytics server may then display the user interface controls on a single page for the user, such that the user can directly interact with the user interface controls without needing to be directed to another page.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain.

For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publically-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
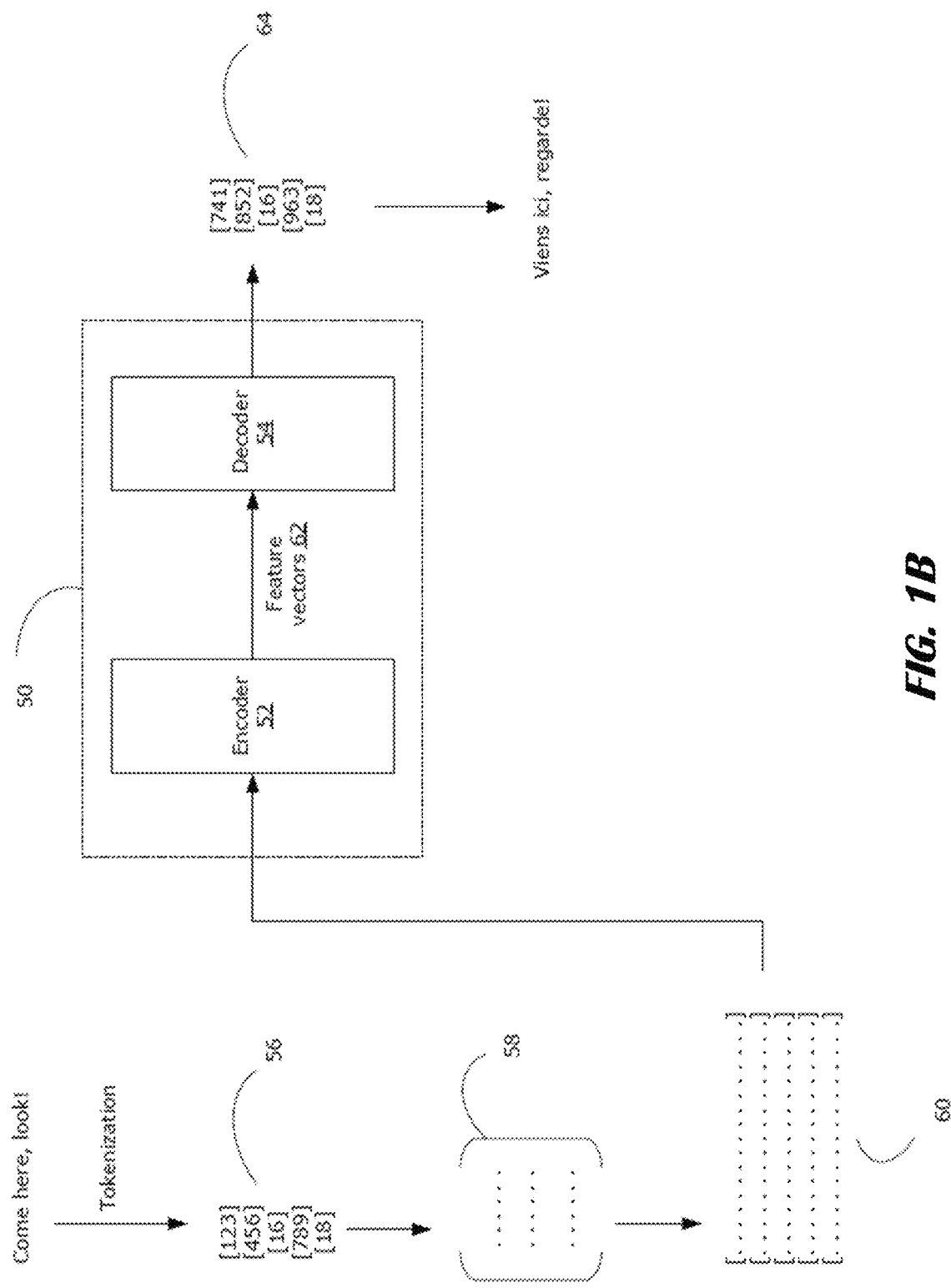
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
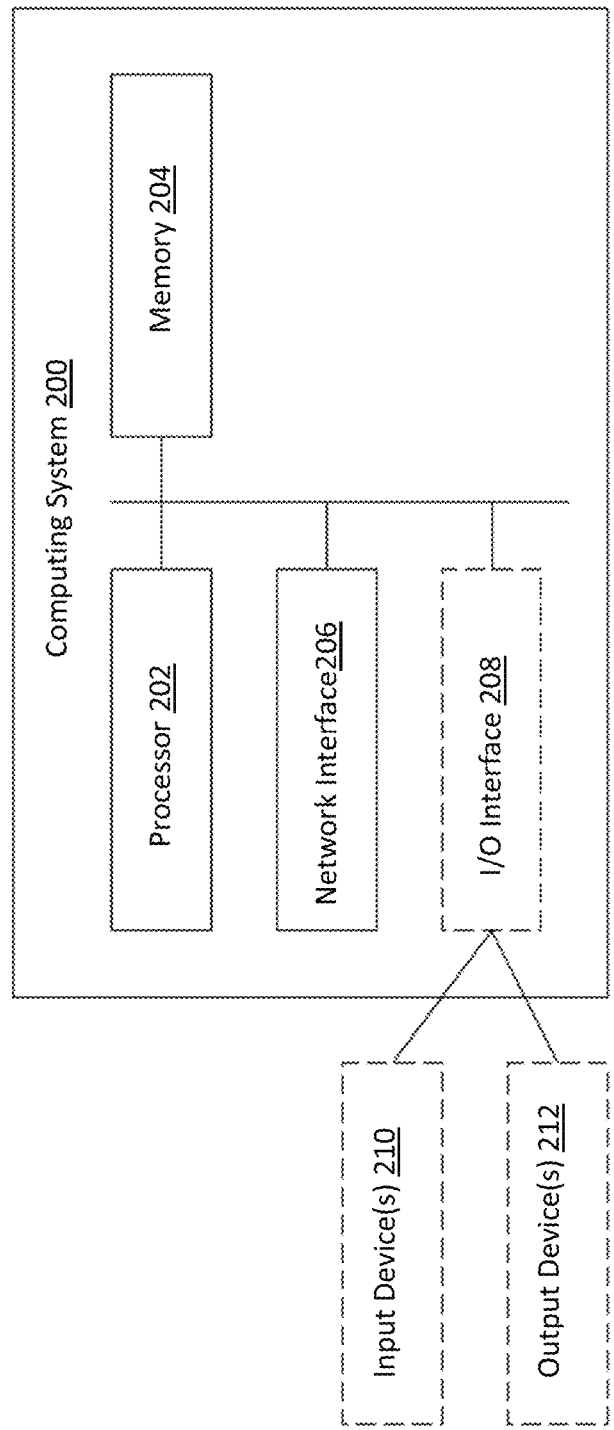
FIG. 2 is a block diagram of an example computing system, which may be used to implement examples of the present disclosure.

FIG. 2 illustrates an example computing system 200, which may be used to implement examples of the present disclosure, such as a prompt generation engine to generate prompts to be provided as input to a language model such as a LLM. Additionally or alternatively, one or more instances of the example computing system 200 may be employed to execute the LLM. For example, a plurality of instances of the example computing system 200 may cooperate to provide output using an LLM in manners as discussed above.

The example computing system 200 includes at least one processing unit, such as a processor 202, and at least one physical memory 204. The processor 202 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 204 may include a volatile or non-volatile memory (e.g., a flash memory, a random access memory (RAM), and/or a read-only memory (ROM)). The memory 204 may store instructions for execution by the processor 202, to the computing system 200 to carry out examples of the methods, functionalities, systems and modules disclosed herein.

The computing system 200 may also include at least one network interface 206 for wired and/or wireless communications with an external system and/or network (e.g., an intranet, the Internet, a P2P network, a WAN and/or a LAN). A network interface may enable the computing system 200 to carry out communications (e.g., wireless communications) with systems external to the computing system 200, such as a language model residing on a remote system.

The computing system 200 may optionally include at least one input/output (I/O) interface 208, which may interface with optional input device(s) 210 and/or optional output device(s) 212. Input device(s) 210 may include, for example, buttons, a microphone, a touchscreen, a keyboard, etc. Output device(s) 212 may include, for example, a display, a speaker, etc. In this example, optional input device(s) 210 and optional output device(s) 212 are shown external to the computing system 200. In other examples, one or more of the input device(s) 210 and/or output device(s) 212 may be an internal component of the computing system 200.

A computing system, such as the computing system 200 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

I. Example E-Commerce Platform

Figure 3:
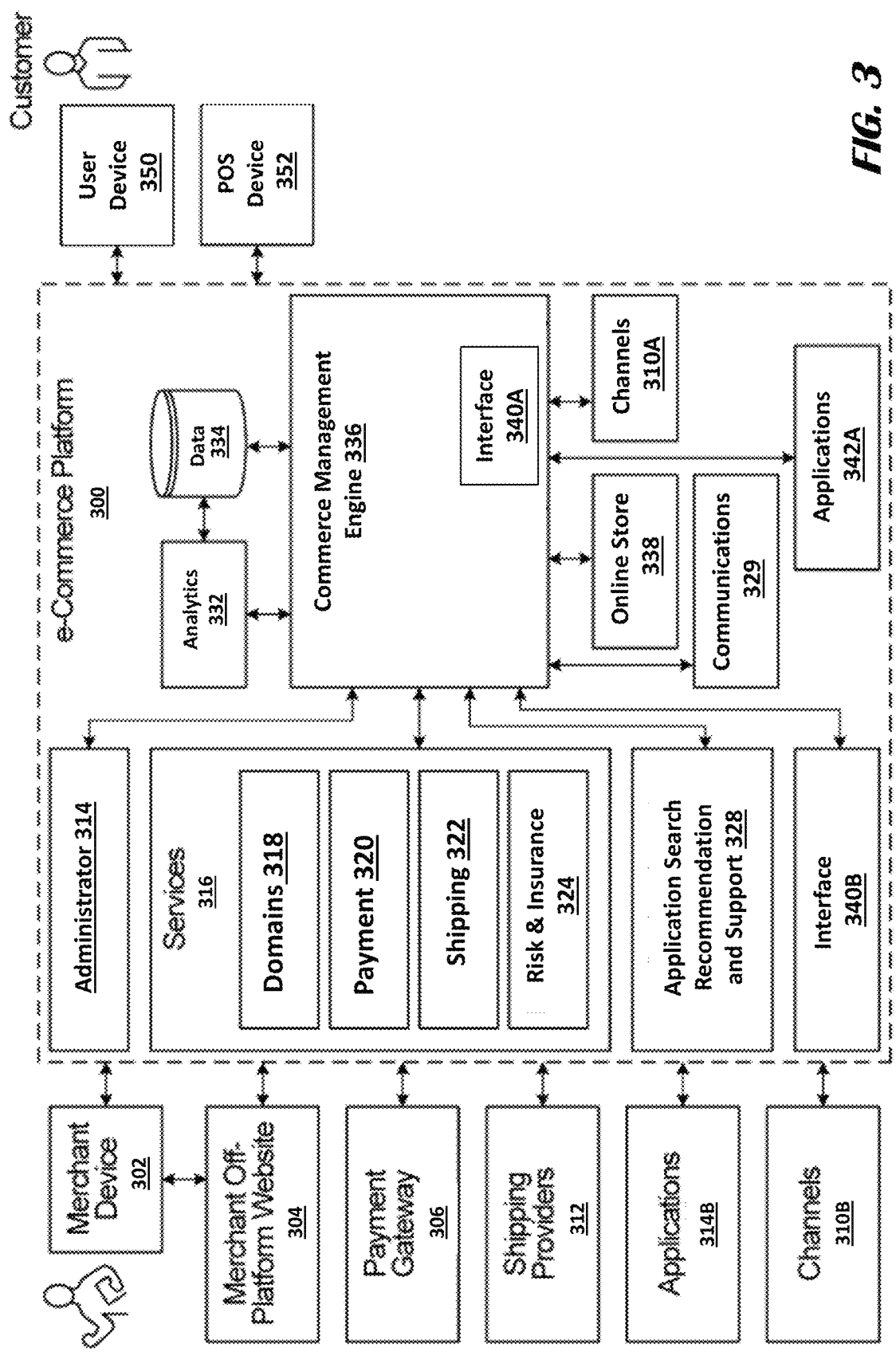
FIG. 3 shows an e-commerce platform, according to an embodiment.

In some embodiments, the methods disclosed herein may be performed on or in association with a commerce platform, such as an e-commerce platform. FIG. 3 illustrates an e-commerce platform 300, according to an illustrative system embodiment. The e-commerce platform 300 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 300 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 300 for potential use in marketing and selling products, and the like), a service provider user (e.g., a shipping provider 312, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 300 may provide a centralized system for providing merchants with online resources and facilities for managing their business. The facilities described herein may be deployed in part or in whole through a machine that executes computer software, modules, program codes, and/or instructions on one or more processors which may be part of or external to the e-commerce platform 300. Merchants may utilize the e-commerce platform 300 for managing commerce with customers, such as by implementing an e-commerce experience with customers through an online store 338, through channels 310A-B, through POS devices 352 in physical locations (e.g., a physical storefront or other location such as through a kiosk, terminal, reader, printer, 3D printer, and the like), by managing their business through the e-commerce platform 300, and by interacting with customers through a communications facility 329 of the e-commerce platform 300, or any combination thereof. A merchant may utilize the e-commerce platform 300 as a sole commerce presence with customers, or in conjunction with other merchant commerce facilities, such as through a physical store (e.g., 'brick-and-mortar' retail stores), a merchant off-platform website 304

(e.g., a commerce Internet website or other internet or web property or asset supported by or on behalf of the merchant separately from the e-commerce platform 300), and the like. However, even these 'other' merchant commerce facilities may be incorporated into the e-commerce platform 300, such as where POS devices 352 in a physical store of a merchant are linked into the e-commerce platform 300, where a merchant off-platform website 304 is tied into the e-commerce platform 300, such as through 'buy buttons' that link content from the merchant off-platform website 304 to the online store 338, and the like.

The online store 338 may represent a multitenant facility comprising a plurality of virtual storefronts. In embodiments, merchants may manage one or more storefronts in the online store 338, such as through a merchant device 302 (e.g., computer, laptop computer, mobile computing device, and the like), and offer products to customers through a number of different channels 310A-B (e.g., an online store 338; a physical storefront through a POS device 352; electronic marketplace, through an electronic buy button integrated into a website or social media channel such as on a social network, social media page, social media messaging system; and the like). A merchant may sell across channels 310A-B and then manage their sales through the e-commerce platform 300, where channels 310A may be provided internal to the e-commerce platform 300 or from outside the e-commerce channel 310B. A merchant may sell in their physical retail store, at pop ups, through wholesale, over the phone, and the like, and then manage their sales through the e-commerce platform 300. A merchant may employ all or any combination of these, such as maintaining a business through a physical storefront utilizing POS devices 352, maintaining a virtual storefront through the online store 338, and utilizing a communication facility 329 to leverage customer interactions and analytics 332 to improve the probability of sales. Throughout this disclosure the terms of online store 338 and storefront may be used synonymously to refer to a merchant's online e-commerce offering presence through the e-commerce platform 300, where an online store 338 may refer to the multitenant collection of storefronts supported by the e-commerce platform 300 (e.g., for a plurality of merchants) or to an individual merchant's storefront (e.g., a merchant's online store).

In some embodiments, a customer may interact through a customer device 350 (e.g., computer, laptop computer, mobile computing device, and the like), a POS device 352 (e.g., retail device, a kiosk, an automated checkout system, and the like), or any other commerce interface device known in the art. The e-commerce platform 300 may enable merchants to reach customers through the online store 338, through POS devices 352 in physical locations (e.g., a merchant's storefront or elsewhere), to promote commerce with customers through dialog via electronic communication facility 329, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 300, merchant devices 302, payment gateways 306, application developers, channels 310A-B, shipping providers 312, customer devices 350, point of sale devices 352, and the like. The e-commerce platform 300 may be implemented as a cloud computing service, a software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 300 may be implemented to operate on various platforms and operating systems, such as iOS, Android, on the web, and the like (e.g., the administrator 314 being implemented in multiple instances for a given online store for iOS, Android, and for the web, each with similar functionality).

In some embodiments, the online store 338 may be served to a customer device 350 through a webpage provided by a server of the e-commerce platform 300. The server may receive a request for the webpage from a browser or other application installed on the customer device 350, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 350 and then the template language is replaced by data from the online store 338, such as when a theme is installed. The template and themes may consider tags, objects, and filters. The web browser (or other application) of the customer device 350 then renders the page accordingly.

In some embodiments, online stores 338 may be served by the e-commerce platform 300 to customers, where customers can browse and purchase the various products available (e.g., add them to a cart, purchase immediately through a buy-button, and the like). Online stores 338 may be served to customers in a transparent fashion without customers necessarily being aware that it is being provided through the e-commerce platform 300 (rather than directly from the merchant). Merchants may use a merchant configurable domain name, a customizable HTML theme, and the like, to customize their online store 338. Merchants may customize the look and feel of their website through a theme system, such as where merchants can select and change the look and feel of their online store 338 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 338, such as through blogs, articles, and the like, as well as configure navigation menus. Merchants may upload images (e.g., for products), video, content, data, and the like to the e-commerce platform 300, such as for storage by the system (e.g., as data facility 334). In some embodiments, the e-commerce platform 300 may provide functions for resizing images, associating an image with a product, adding and associating text with an image, adding an image for a new product variant, protecting images, and the like.

As described herein, the e-commerce platform 300 may provide merchants with transactional facilities for products through a number of different channels 310A-B, including the online store 338, over the telephone, as well as through physical POS devices 352 as described herein. The e-commerce platform 300 may include business support services 316, an administrator 314, and the like associated with running an on-line business, such as providing a domain service 318 associated with their online store, payment services 320 for facilitating transactions with a customer, shipping services 322 for providing customer shipping options for purchased products, risk and insurance services 324 associated with product protection and liability, merchant billing, and the like. Services 316 may be provided via the e-commerce platform 300 or in association with external facilities, such as through a payment gateway 306 for payment processing, shipping providers 312 for expediting the shipment of products, and the like.

In some embodiments, the e-commerce platform 300 may provide for integrated shipping services 322 (e.g., through an e-commerce platform shipping facility or through a third-party shipping carrier), such as providing merchants with real-time updates, tracking, automatic rate calculation, bulk order preparation, label printing, and the like.

Figure 4:
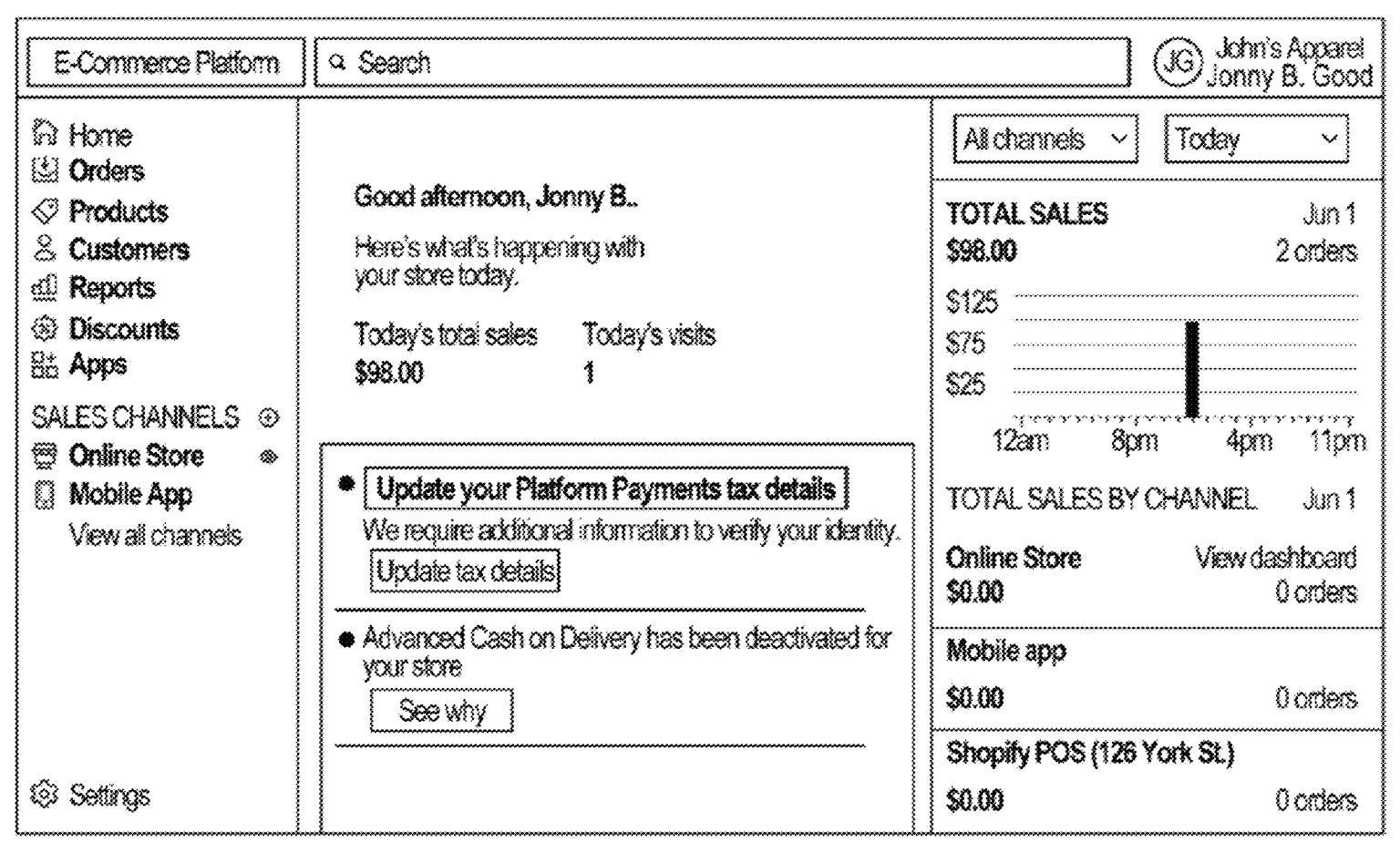

FIG. 4 depicts a non-limiting embodiment for a home page of a merchant administrator 314, which may show information about daily tasks, a store's recent activity, and the next steps a merchant can take to build their business. In some embodiments, a merchant may log in to administrator 314 via a merchant device 302 such as from a desktop computer or mobile device, and manage aspects of their online store 338, such as viewing the online store's 338 recent activity, updating the online store's 338 catalog, managing orders, recent visits activity, total orders activity, and the like. In some embodiments, the merchant may be able to access the different sections of administrator 314 by using the sidebar, such as shown on FIG. 4. Sections of the administrator 314 may include various interfaces for accessing and managing core aspects of a merchant's business, including orders, products, customers, available reports and discounts. The administrator 314 may also include interfaces for managing sales channels for a store including the online store 338, mobile application(s) made available to customers for accessing the store (Mobile App), POS devices, and/or a buy button. The administrator 314 may also include interfaces for managing applications (Apps) installed on the merchant's account; settings applied to a merchant's online store 338 and account. A merchant may use a search bar to find products, pages, or other information. Depending on the merchant device 302 or software application the merchant is using, they may be enabled for different functionality through the administrator 314. For instance, if a merchant logs in to the administrator 314 from a browser, they may be able to manage all aspects of their online store 338. If the merchant logs in from their mobile device (e.g., via a mobile application), they may be able to view all or a subset of the aspects of their online store 338, such as viewing the online store's 338 recent activity, updating the online store's 338 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 310A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 338, such as based on account status, growth, recent customer activity, and the like. Notifications may be provided to assist a merchant with navigating through a process, such as capturing a payment, marking an order as fulfilled, archiving an order that is complete, and the like.

The e-commerce platform 300 may provide for a communications facility 329 and associated merchant interface for providing electronic communications and marketing, such as utilizing an electronic messaging aggregation facility for collecting and analyzing communication interactions between merchants, customers, merchant devices 302, customer devices 350, POS devices 352, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 329 analyzes the interaction and provides analysis to the merchant on how to improve the probability for a sale.

The e-commerce platform 300 may provide a financial facility 320 for secure financial transactions with customers, such as through a secure card server environment. The e-commerce platform 300 may store credit card information, such as in payment card industry data (PCI) environments (e.g., a card server), to reconcile financials, bill merchants, perform automated clearing house (ACH) transfers between an e-commerce platform 300 financial institution account and a merchant's bank account (e.g., when using capital), and the like. These systems may have Sarbanes-Oxley Act (SOX) compliance and a high level of diligence required in their development and operation. The financial facility 320 may also provide merchants with financial support, such as through the lending of capital (e.g., lending funds, cash advances, and the like) and provision of insurance. In addition, the e-commerce platform 300 may provide for a set of marketing and partner services and control the relationship between the e-commerce platform 300 and partners. They also may connect and onboard new merchants with the e-commerce platform 300. These services may enable merchant growth by making it easier for merchants to work across the e-commerce platform 300. Through these services, merchants may be provided help facilities via the e-commerce platform 300.

In some embodiments, online store 338 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 300. In some embodiments, the e-commerce platform 300 may store this data in a data facility 334. The transactional data may be processed to produce analytics 332, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 300 may store information about business and merchant transactions, and the data facility 334 may have many ways of enhancing, contributing, refining, and extracting data, where over time the collected data may enable improvements to aspects of the e-commerce platform 300.

Referring again to FIG. 3, in some embodiments the e-commerce platform 300 may be configured with a commerce management engine 336 for content management, task automation and data management to enable support and services to the plurality of online stores 338 (e.g., related to products, inventory, customers, orders, collaboration, suppliers, reports, financials, risk and fraud, and the like), but be extensible through applications 342A-B that enable greater flexibility and custom processes required for accommodating an ever-growing variety of merchant online stores, POS devices, products, and services, where applications 342A may be provided internal to the e-commerce platform 300 or applications 342B from outside the e-commerce platform 300. In some embodiments, an application 342A may be provided by the same party providing the e-commerce platform 300 or by a different party. In some embodiments, an application 342B may be provided by the same party providing the e-commerce platform 300 or by a different party. The commerce management engine 336 may be configured for flexibility and scalability through portioning (e.g., sharding) of functions and data, such as by customer identifier, order identifier, online store identifier, and the like. The commerce management engine 336 may accommodate store-specific business logic and in some embodiments, may incorporate the administrator 314 and/or the online store 338.

The commerce management engine 336 includes base or "core" functions of the e-commerce platform 300, and as such, as described herein, not all functions supporting online stores 338 may be appropriate for inclusion. For instance, functions for inclusion into the commerce management engine 336 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 338 (e.g., functions that can be re-used/modified across core functions), limited to the context of a single online store 338 at a time (e.g., implementing an online store 'isolation principle', where code should not be able to interact with multiple online stores 338 at a time, ensuring that online stores 338 cannot access each other's data), provide a transactional workload, and the like. Maintaining control of what functions are implemented may enable the commerce management engine 336 to remain responsive, as many required features are either served directly by the commerce management engine 336 or enabled through an interface 340A-B, such as by its extension through an application programming interface (API) connection to applications 342A-B and channels 310A-B, where interfaces 340A may be provided to applications 342A and/or channels 310A inside the e-commerce platform 300 or through interfaces 340B provided to applications 342B and/or channels 310B outside the e-commerce platform 300. Generally, the e-commerce platform 300 may include interfaces 340A-B (which may be extensions, connectors, APIs, and the like) which facilitate connections to and communications with other platforms, systems, software, data sources, code and the like. Such interfaces 340A-B may be an interface 340A of the commerce management engine 336 or an interface 340B of the e-commerce platform 300 more generally. If care is not given to restricting functionality in the commerce management engine 336, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 336 may be configured to maintain responsiveness, such as through configuration that utilizes timeouts, queues, backpressure to prevent degradation, and the like.

Although isolating online store data is important to maintaining data privacy between online stores 338 and merchants, there may be reasons for collecting and using cross-store data, such as for example, with an order risk assessment system or a platform payment facility, both of which require information from multiple online stores 338 to perform well. In some embodiments, rather than violating the isolation principle, it may be preferred to move these components out of the commerce management engine 336 and into their own infrastructure within the e-commerce platform 300.

In some embodiments, the e-commerce platform 300 may provide for a platform payment facility 320, which is another example of a component that utilizes data from the commerce management engine 336 but may be located outside so as to not violate the isolation principle. The platform payment facility 320 may allow customers interacting with online stores 338 to have their payment information stored safely by the commerce management engine 336 such that they only have to enter it once. When a customer visits a different online store 338, even if they've never been there before, the platform payment facility 320 may recall their information to enable a more rapid and correct check out. This may provide a cross-platform network effect, where the e-commerce platform 300 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 338. It would be difficult and error prone for each online store 338 to be able to connect to any other online store 338 to retrieve the payment information stored there. As a result, the platform payment facility may be implemented external to the commerce management engine 336.

For those functions that are not included within the commerce management engine 336, applications 342A-B provide a way to add features to the e-commerce platform 300. Applications 342A-B may be able to access and modify data on a merchant's online store 338, perform tasks through the administrator 314, create new flows for a merchant through a user interface (e.g., that is surfaced through extensions/API), and the like. Merchants may be enabled to discover and install applications 342A-B through application search, recommendations, and support 328. In some embodiments, core products, core extension points, applications, and the administrator 314 may be developed to work together. For instance, application extension points may be built inside the administrator 314 so that core features may be extended by way of applications, which may deliver functionality to a merchant through the extension.

In some embodiments, applications 342A-B may deliver functionality to a merchant through the interface 340A-B, such as where an application 342A-B is able to surface transaction data to a merchant (e.g., App: "Engine, surface my app data in mobile and web admin using the embedded app SDK"), and/or where the commerce management engine 336 is able to ask the application to perform work on demand (Engine: "App, give me a local tax calculation for this checkout").

Applications 342A-B may support online stores 338 and channels 310A-B, provide for merchant support, integrate with other services, and the like. Where the commerce management engine 336 may provide the foundation of services to the online store 338, the applications 342A-B may provide a way for merchants to satisfy specific and sometimes unique needs. Different merchants will have different needs, and so may benefit from different applications 342A-B. Applications 342A-B may be better discovered through the e-commerce platform 300 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 342A-B may be connected to the commerce management engine 336 through an interface 340A-B, such as utilizing APIs to expose the functionality and data available through and within the commerce management engine 336 to the functionality of applications (e.g., through REST, GraphQL, and the like). For instance, the e-commerce platform 300 may provide API interfaces 340A-B to merchant and partner-facing products and services, such as including application extensions, process flow services, developer-facing resources, and the like. With customers more frequently using mobile devices for shopping, applications 342A-B related to mobile use may benefit from more extensive use of APIs to support the related growing commerce traffic. The flexibility offered through use of applications and APIs (e.g., as offered for application development) enable the e-commerce platform 300 to better accommodate new and unique needs of merchants (and internal developers through internal APIs) without requiring constant change to the commerce management engine 336, thus providing merchants what they need when they need it. For instance, shipping services 322 may be integrated with the commerce management engine 336 through a shipping or carrier service API, thus enabling the e-commerce platform 300 to provide shipping service functionality without directly impacting code running in the commerce management engine 336.

Many merchant problems may be solved by letting partners improve and extend merchant workflows through application development, such as problems associated with back-office operations (merchant-facing applications 342A-B) and in the online store 338 (customer-facing applications 342A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 342A-B, through extension or API 340A-B, help make products easy to view and purchase in a fast growing marketplace. In some embodiments, partners, application developers, internal applications facilities, and the like, may be provided with a software development kit (SDK), such as through creating a frame within the administrator 314 that sandboxes an application interface. In some embodiments, the administrator 314 may not have control over nor be aware of what happens within the frame. The SDK may be used in conjunction with a user interface kit to produce interfaces that mimic the look and feel of the e-commerce platform 300, such as acting as an extension of the commerce management engine 336.

Applications 342A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 336, such as for synchronizing a local database, notifying an external integration partner, and the like. Update events may enable this functionality without having to poll the commerce management engine 336 all the time to check for updates, such as through an update event subscription. In some embodiments, when a change related to an update event subscription occurs, the commerce management engine 336 may post a request, such as to a predefined callback URL. The body of this request may contain a new state of the object and a description of the action or event. Update event subscriptions may be created manually, in the administrator facility 314, or automatically (e.g., via the API 340A-B). In some embodiments, update events may be queued and processed asynchronously from a state change that triggered them, which may produce an update event notification that is not distributed in real-time.

In some embodiments, the e-commerce platform 300 may provide application search, recommendation and support 328. Application search, recommendation and support 328 may include developer products and tools to aid in the development of applications, an application dashboard (e.g., to provide developers with a development interface, to administrators for management of applications, to merchants for customization of applications, and the like), facilities for installing and providing permissions with respect to providing access to an application 342A-B (e.g., for public access, such as where criteria must be met before being installed, or for private use by a merchant), application searching to make it easy for a merchant to search for applications 342A-B that satisfy a need for their online store 338, application recommendations to provide merchants with suggestions on how they can improve the user experience through their online store 338, a description of core application capabilities within the commerce management engine 336, and the like. These support facilities may be utilized by application development performed by any entity, including the merchant developing their own application 342A-B, a third-party developer developing an application 342A-B (e.g., contracted by a merchant, developed on their own to offer to the public, contracted for use in association with the e-commerce platform 300, and the like), or an application 342A or 342B being developed by internal personal resources associated with the e-commerce platform 100. In some embodiments, applications 342A-B may be assigned an application identifier (ID), such as for linking to an application (e.g., through an API), searching for an application, making application recommendations, and the like.

The commerce management engine 336 may include base functions of the e-commerce platform 300 and expose these functions through APIs 340A-B to applications 342A-B. The APIs 340A-B may enable different types of applications built through application development. Applications 342A-B may be capable of satisfying a great variety of needs for merchants but may be grouped roughly into three categories: customer-facing applications, merchant-facing applications, integration applications, and the like. Customer-facing applications 342A-B may include online store 338 or channels 310A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 342A-B may include applications that allow the merchant to administer their online store 338 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 312 and payment gateways.

In some embodiments, an application developer may use an application proxy to fetch data from an outside location and display it on the page of an online store 338. Content on these proxy pages may be dynamic, capable of being updated, and the like. Application proxies may be useful for displaying image galleries, statistics, custom forms, and other kinds of dynamic content. The core-application structure of the e-commerce platform 300 may allow for an increasing number of merchant experiences to be built in applications 342A-B so that the commerce management engine 336 can remain focused on the more commonly utilized business logic of commerce.

The e-commerce platform 300 provides an online shopping experience through a curated system architecture that enables merchants to connect with customers in a flexible and transparent manner. A typical customer experience may be better understood through an embodiment example purchase workflow, where the customer browses the merchant's products on a channel 310A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 310A-B. A channel 310A-B is a place where customers can view and buy products. In some embodiments, channels 310A-B may be modeled as applications 342A-B (a possible exception being the online store 338, which is integrated within the commence management engine 336). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 338 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 300 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 310A-B may use the commerce management engine 336 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 306 may be provided through a card server environment. In some embodiments, the payment gateway 306 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 336 may support many other payment methods, such as through an offsite payment gateway 306 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 310A-B that do not rely on commerce management engine 336 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that does not provide an API connection). An API fulfillment service may trigger a third-party, where the third-party application creates a fulfillment record. A legacy fulfillment service may trigger a custom API call from the commerce management engine 336 to a third-party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 300 may make the merchant aware of compliance issues with respect to legal obligations (e.g., with respect to taxes). In some embodiments, the e-commerce platform 300 may enable merchants to keep track of changes to the contract of sales over time, such as implemented through a sales model component (e.g., an append-only date-based ledger that records sale-related events that happened to an item).

Figure 5:
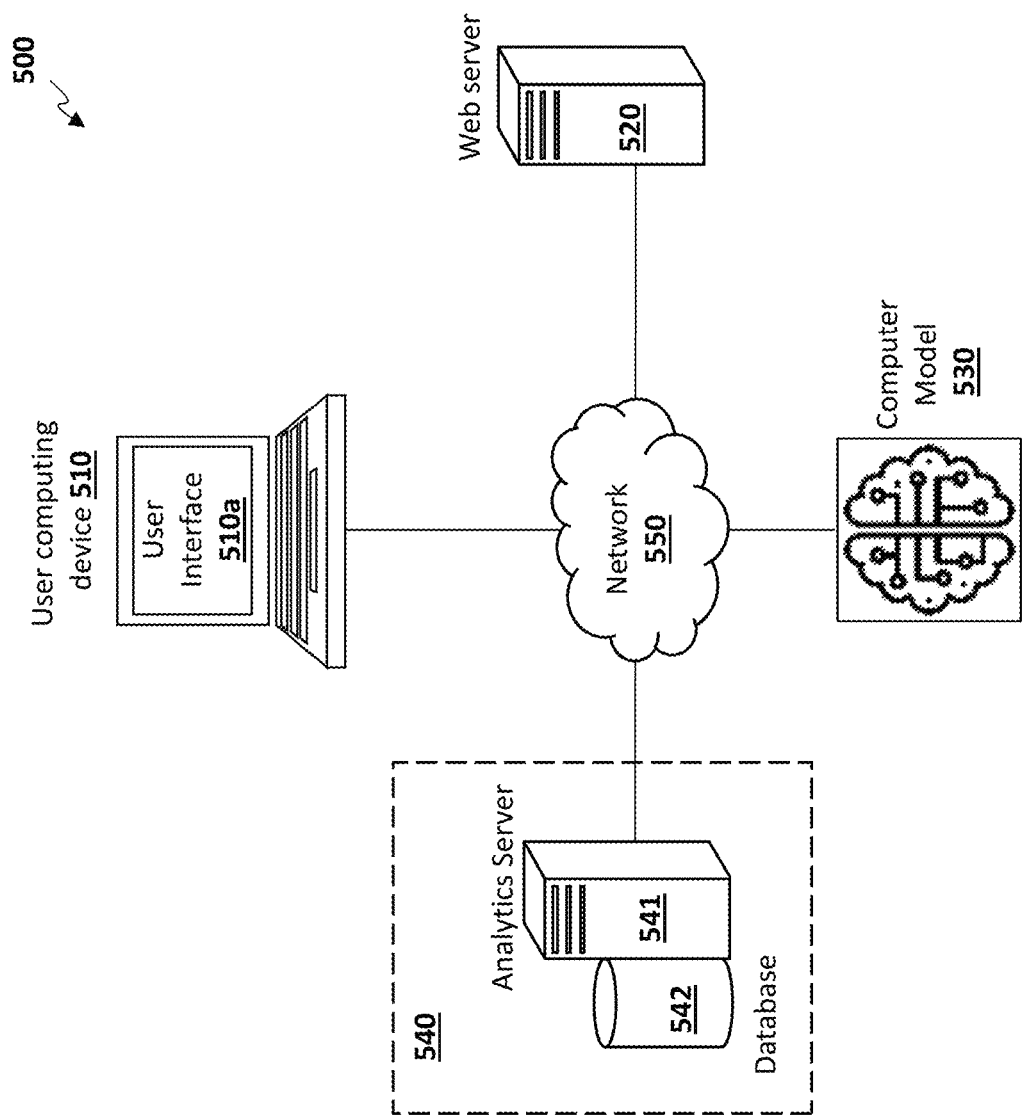
FIG. 5 shows components of a dynamic user interface control generation system, according to an embodiment.

II. Example Networked Components of a Dynamic User Interface Control Generation System FIG. 5 illustrates various components of a dynamic user interface control generation system (also referred to herein as the system 500). The system 500 provides a non-limiting example of a computer system having various features that can be utilized to dynamically generate various input elements that can revise the appearance of a user interface (e.g., website or any other electronic platform). The system 500 (and in particular an analytics server 541) can be used by a user operating the user computing device 510 to receive one or more input elements that can be used to configure or reconfigure the appearance of a user interface 510a (e.g., a website or other system settings) that can be displayed on the user computing device 510 and/or any other computing devices.

The system 500 may include the analytics server 541, web server 520, computer model 530, and user-computing device 510. These features may communicate with each other over a network 550. The network 550 may include but is not limited to, private or public local area network, wireless local area network, metropolitan area network, wide-area network, and the Internet. The network 550 may further include both wired and wireless communications according to one or more standards via one or more transport mediums. The communication over network 550 is in accordance with various communication protocols such as transmission control protocol and internet protocol, user datagram protocol, and Institute of Electrical and Electronics Engineers communication protocols. The network 550 may further include wireless communications according to Bluetooth specification sets, or another standard or proprietary wireless communication protocol. The network 550 may further include communications over a cellular network, including, for example, a global system for mobile communications, code division multiple access, and enhanced data for a global evolution network.

The system 500 may operate in a local computing environment where the user-computing device 510 may execute an application to access and/or revise a user interface (of an electronic platform) generated, hosted, and/or provided by the web server 520. An example of an electronic platform may be a website accessible through a browser application. Using the methods and systems discussed herein, the analytics server 541 may allow a user operating the user computing device 510 to revise the appearance of a platform (e.g., user interface or another website). The website (not shown herein) may be hosted by the analytics server 541 and/or the web server 520. Even though some example embodiments describe revisions to settings for a website hosted by the web server 520, the methods and systems described herein are not limited to websites.

The system 500 may operate in a cloud-computing environment where the user-computing device 510 may be cloud-optimized. The user-computing device 510 data may execute the browser application and access graphical user interfaces and elements generated by the analytics server 541. The graphical user interfaces and elements generated by the analytics server 541 (e.g., services provided by the analytics server 541) may be stored and executed on a remote cloud-based analytics server 541 accessed over a network cloud. In the cloud-computing environment, a web browser on the user-computing device 510 may interface with an application program associated with the analytics server 541, which is executed remotely via cloud-based technology.

The analytics server 541 may be any computing device capable of performing the actions described herein. For instance, the analytics server 541 may include a processing unit and a non-transitory machine-readable storage medium. The processing unit may include at least one processor with a computer-readable medium, such as a random-access memory coupled to the processor. The analytics server 541 may execute algorithms or computer-executable program instructions using a single processor or multiple processors in a distributed configuration. The analytics server 541 may be configured to interact with one or more software modules of the same or a different type operating within the system 500. In some embodiments, the analytics server 541 may be a part of or otherwise associated with the e-commerce platform discussed herein.

Non-limiting examples of the processor may include a microprocessor, an application-specific integrated circuit, and a field programmable object array, among others. The analytics server 541 is capable of executing data processing tasks, data analysis tasks, and valuation tasks. Non-limiting examples of the analytics server 541 may include a desktop computer, a server computer, a laptop computer, a tablet computer, and the like. For case of explanation, FIG. 5 depicts a single server computing device functioning as the analytics server 541. However, some embodiments may include a plurality of server computing devices capable of performing various tasks described herein.

The analytics server 541 may utilize a database, such as the database 542, to store and/or retrieve various data described herein. For instance, the analytics server 541 may store different data corresponding to different input elements, their capabilities/functionalities (e.g., which aspect of the user interface they can revise), and the like. The database 542 may also include various corpus and text descriptions for different user interface controls and input elements configured to revise different user interface elements. The database 542 may also include data associated with the user operating the user-computing device 510, such as user preferences, previously implemented user interface revisions, and the like. The database 542 may be integrated with analytics server 541 or communicatively coupled to the analytics server 541.

The web server 520 may be a computing device hosting a website (or any other electronic platform) accessible to the user-computing device 510 (and other users using other computing devices) via the network 550. The web server 520 may include a processing unit and non-transitory machine-readable storage capable of executing various tasks described herein. The processing unit may include at least one processor with a computer-readable medium, such as a random-access memory coupled to the processor. Non-limiting examples of the processor may include a microprocessor, an application-specific integrated circuit, and a field programmable object array, among others. Non-limiting examples of the web server 520 may include workstation computers, laptop computers, server computers, laptop computers, and the like. While the system 500 includes a single web server 520, in some embodiments the web server 520 may include several computing devices operating in a distributed computing environment.

The web server 520 may execute algorithms or computer-executable program instructions using a single processor or multiple processors in a distributed configuration. The web server 520 may be configured to interact with one or more software modules of the same or a different type operating within the system 500. For instance, the web server 520 may execute software applications configured to host an electronic platform, which may generate and serve various webpages displayed onto the user-computing device 510 and/or other computers.

The user-computing device 510 is a computing device including a processing unit. The processing unit may execute a valuation software application or a web browser application that accesses or receives data records from various data sources. The processing unit may include a processor with a computer-readable medium, such as a random-access memory coupled to the processor. The user-computing device 510 may be running algorithms or computer-executable program instructions, which may be executed by a single processor or multiple processors in a distributed configuration. The user-computing device 510 may interact with one or more software modules of the same or a different type operating within the system 500.

Non-limiting examples of the processor may include a microprocessor, an application-specific integrated circuit, and a field programmable object array, among others. Non-limiting examples of the user-computing device 510 may include a server computer, a workstation computer, a tablet device, and a mobile device (e.g., smartphone, PDA). A user may operate the user-computing device 510. The user may be a client of a merchant using the e-commerce platform to operate a merchant website and the analytics server to revise its visual aspects. For case of explanation, FIG. 5 illustrates a single computing device functioning as the user-computing device 510. However, some embodiments may include a plurality of computing devices capable of performing the tasks described herein.

The system 500 may also include various computer models, such as the computer model 530. The computer model 530 may be any collection of algorithms, such as any artificial intelligence model using machine learning techniques to analyze data. In some embodiments, the computer model 530 may be a generative or language model, such as the computer models discussed in FIGS. 1-2.

III. Methods Executed in a Dynamic User Interface Control Generation System

Figure 6:
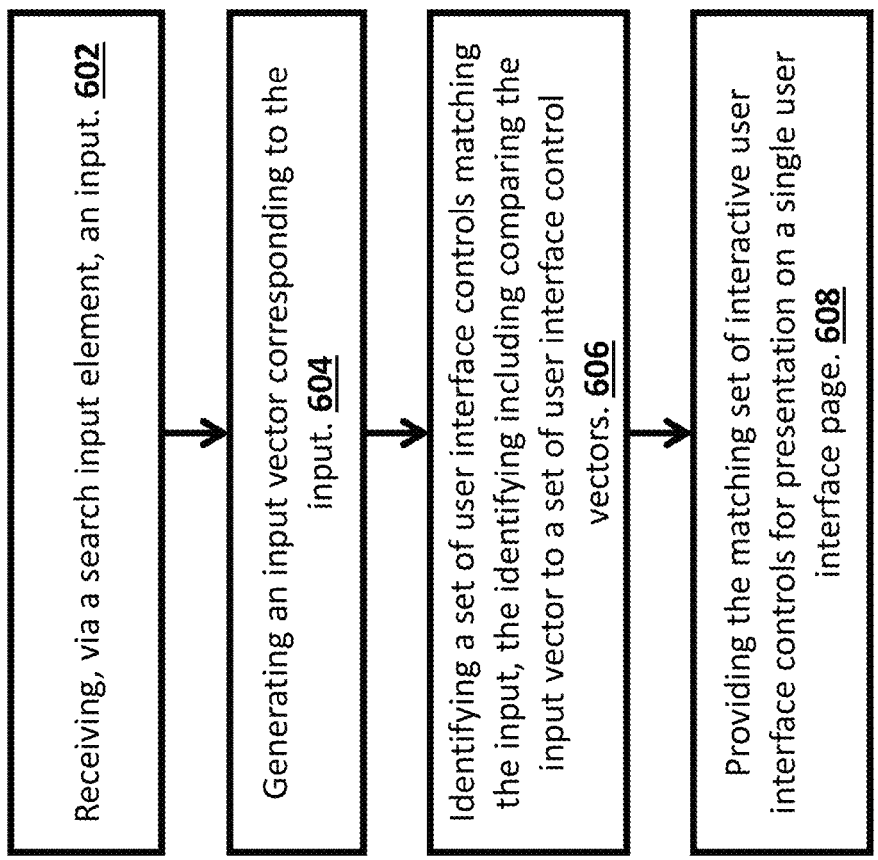
FIG. 6 shows execution steps for a dynamic user interface control generation system, according to an embodiment.

FIG. 6 illustrates a flowchart depicting operational steps for dynamically generating user interface controls, in accordance with an embodiment. The method 600 describes how a server, such as the analytics server or even locally on the user computing device described herein, can generate a customized set of user interface controls based on an input (or an intent) of a user. Even though the method 600 is described as being executed by the analytics server, the method 600 can be executed by any server and/or locally within a user's computing device or as a browser extension. Additionally, or alternatively a server can execute the method 600 in other computer environments (other than the environments depicted in FIGS. 1-5). For instance, the method 600 can be executed by a server providing SaaS in a non-e-commerce infrastructure for any electronic platform (e.g., any website regardless of whether the website is related to e-commerce).

Additionally, or alternatively, the method 600 can be executed by a web server acting as both a web server and the analytics server by hosting the website and generating the user interface controls described herein. Furthermore, other configurations of the method 600 may comprise additional or alternative steps or may omit one or more steps altogether.

Conventional methods for identifying user interface controls (e.g., input elements and other components of different settings that are configured to receive instructions from a user to revise a user interface) may create negative user experiences by requiring conventional text-based searching. The methods and systems discussed herein allow an intelligent searching mechanism that is configured to infer user interface controls pertinent to a user's desired user interface modifications and revisions. Moreover, the methods and systems discussed herein may reconfigure a presentation that provides the identified/relevant user interface controls and input elements for the inferred input elements.

At step 602, the analytics server may receive, via a search input element, an input, which may be associated with a setting. A user may desire to adjust a setting or aspect of a user interface. As discussed herein, the analytics server may provide various input elements, such as a search bar, radio button, drop-down menu, or the like for adjusting the setting. But the user may not know where to find the setting or does not want to traverse multiple menus to utilize it. In some embodiments, the search input element (e.g., a search bar 702 in FIG. 7) may allow the user to input their desired revision to a user interface in natural language, by inputting keywords, and/or selecting an option via an input element. The analytics server may predict or determine the intent of the user based upon the input so that the user can be presented with one or more user interface controls that are likely to be responsive.

At step 604, the analytics server may generate an input vector corresponding to the input received from the user. The analytics server may use various protocols including a language model utilizing machine learning techniques or other algorithmic methods to generate a vector representing the input received from the user in the step 602.

The analytics server may employ various methods to vectorize the input received. When the input is textual, the analytics server may employ various techniques to convert textual data into numerical representations (e.g., vectors). This process may also be referred to as word embedding, where each word in the text is mapped to a high-dimensional vector based on its context and semantic meaning. As discussed herein, the vectors can be used (by the analytics server) to infer relationships between user interface controls and input elements that are pertinent to the user's intent. The analytics server may use the word vectors to capture relationships and similarities between words, allowing the language model to understand semantic associations and make more accurate predictions during analysis (e.g., in step 606).

The analytics server may first tokenize the input received into different segments of the text received, such as sub-words or other text segments. Once the text is tokenized into individual words or sub-words, the analytics server may assign each token its corresponding vector representation that captures essential linguistic features, such as word semantics, syntax, and contextual information.

In some embodiments, the analytics server may optionally train an artificial intelligence model (e.g., a large language model) to summarize/infer/extract an intended desired modification of the user interface based on the user's input (sometimes received in natural language and sometimes received via buttons). The trained AI model may tokenize the text and/or may directly infer the key terms that indicate the user's intent. The AI model may then vectorize the predicted key terms.

At step 606, the analytics server may identify a set of user interface controls matching (or otherwise corresponding to) the input, the identifying including comparing the input vector to a set of user interface control vectors. The analytics server may use the embeddings (e.g., vector(s) that represent the input received from the user) to determine which user interface controls are pertinent and represent the user's intent. For instance, the analytics server may compare the embeddings to a list of contextualized data associated with different user interface controls.

The analytics server (or another server) may first generate searchable contextual text associated with each user interface control (e.g., setting and/or input element). The searchable contextual text may include keywords identified and/or retrieved from various corpus of text describing different user interface controls. For instance, the analytics server may retrieve a description of the functionality for each user interface control from a third party or from an entity that generates or operates the user interface control.

Moreover, the analytics server may include descriptions extracted from different websites, forums (e.g., users discussing different functionalities), FAQ pages, helpdesk pages, and the like. In some embodiments, a human reviewer may review the searchable contextual text and revise the text as needed.

After collecting and aggregating the text describing the functionality and attributes of different user interface controls, the analytics server may convert the text into vectors and generate a new searchable contextualized/vectorized corpus that represents different user interface controls.

The analytics server may then compare the vectorized text (generated based on the input in step 602-4) to the vectorized text that represents different user interface controls. In this way, the analytics server can identify a user interface control having a description that matches or corresponds to (at least partially) the input received from the user. Therefore, by matching the two texts, the analytics server may infer the user interface control desired by the user based on the user's input. As a result, the analytics server may present a user interface control based on an inference rather than relying only on the input exactly matching a name for a particular user interface control.

To compare two vectorized corpora of texts and identify similarities, the analytics server may utilize various methods. In some embodiments, the analytics server may calculate the distance (e.g., cosine similarity) between the two vectorized tokens of texts. The distance may represent the similarity between two vectors (and ultimately between the two underlying tokenized texts). Thereby the distance can be used to map the user's intent to a particular user interface control or its relevant input element. Therefore, the distance may be used as a selection criterion for the user interface control. For instance, the analytics server may determine that two text vectors are pertinent when their corresponding distance satisfies (is less than) a threshold.

Additionally, or alternatively, the analytics server may use a clustering algorithm (e.g., K-means or hierarchical clustering) in which similar vectors are clustered together, such that different clusters of tokenized texts that exhibit similar patterns, themes, or contexts are identified.

In some embodiments, the analytics server may optionally train an artificial intelligence model (e.g., a large language model) to compare the texts (vectorized in the step 604) to text representing different user interface controls. Additionally or alternatively, the artificial intelligence model may ingest the input received from the user and predict a pertinent In some embodiments, a single artificial intelligence model may be trained to ingest input from a user and compare the input (or a vectorized and/or tokenized version of the input) to a corpus of text describing different user interface controls. The artificial intelligence model may then predict which control interface controls are pertinent to the user's input (e.g., which user interface controls are desired by the user).

In the step 608, the analytics server may provide the matching set of interactive user interface controls for presentation on a single user interface page. Once one or more settings or input elements are identified (step 606), the analytics server may then display the user interface controls in a single user interface for the user. The analytics server may provide the user interface control in a variety of ways. In the first example, the analytics server may rank the user interface controls in accordance with the calculated distances. As a result, the analytics server may display a graphical indicator (e.g., icon) or sometimes deep links for each user interface control that is identified to be pertinent to the user's input. The user may then interact with a graphical indicator of a user interface control and the analytic server may direct the user to an interface of the selected user interface control. When using an AI model to predict the relevant user interface controls, the analytics server may rank the user interface control in accordance with a likelihood of relevance (instead of or in addition to a distance).

In a second example, the analytics server may only show the top three results ranked in accordance with their respective distances. For instance, the analytics server may provide a graphical indicator (e.g., icons) or sometimes deep links to the top three (or any other number) of the identified user interface controls. When using an AI model to predict the relevant user interface controls, the analytics server may rank the user interface control in accordance with a likelihood of relevance (instead of or in addition to a distance).

In a third example, the analytics server may display one or more input elements in accordance with their respective distances. When using an AI model to predict the relevant user interface controls, the analytics server may rank the user interface control in accordance with a likelihood of relevance (instead of or in addition to a distance). In this way, the results displayed to a user are customized for the user and include interactive results that can be interacted with directly by the user. For instance, when the user inputs "make my buttons thicker," the model may map the intent of the user-to-user interface control of "buttons" and the input elements of "button_border_thickness" and "button_border_opacity." The analytics server may select "colors_accent_1" within the "button section" based on its corresponding vector distance. In this example, the analytics server displays an input element (e.g., drop-down menu or slider) that is configured to change the button thickness.

Accordingly, the user does not need to be directed toward another page and can directly interact with different input elements to revise the user interface. As a result, the user may interact with one or more sliders to revise the button thickness, as needed. However, the server may populate the search results using the elements themselves, thereby creating a customized interface.

The analytics server may monitor how the user interacts with the provided user interface control and retrieve a value inputted by the user (e.g., 8/10 on the darkness scale). The analytics server may then transmit the 8/10 value to a web server that operationally controls or is configured to revise a darkness aspect of the user interface. As a result, the web server may implement the change requested by the user without the user having to navigate to the pertinent user interface control or directly communicating with the web server. In this way, the user may revise one or more aspects of a user interface using only natural language (or other input methods) without needing to revise code or even identify the pertinent user interface control.

In some embodiments, the server may prepopulate the input element(s) of a user interface control accordingly. For instance, the server may query a parameter value associated with the user's intended revision, receive a value from the user, and instruct another server (webserver) to revise the user interface based on the new value. In a non-limiting example, a user may input "change my box thickness to 0.8." As a result, the analytics server may identify input elements associated with the user's request and determine that the current thickness is 0.4. The analytics server may then instruct a web server to change the thickness to 0.8. Optionally, the analytics server may pre-populate the input element for the user to confirm. For instance, when the analytics server determines that the current value is 0.4, the analytics server may prepopulate the input element with the value 0.8 (e.g., a pre-determined threshold higher than the current value). Upon receiving confirmation from the user, the analytics server may instruct the web server to implement the change.

In some embodiments, the server may monitor how different users interact with the provided user interface controls and generate a feedback loop to improve the artificial intelligence model discussed herein and/or generate/train a new artificial intelligence model. For instance, the analytics server may monitor which user interface control and/or input elements were interacted with by the user, as this data indicates the true intent of the user. Using the collected data, the analytics server may re-train the model. In another example, the monitored data may be enriched with data associated with the user and/or the user's business. This data can uncover patterns regarding how different users (and their attributes) intend different revisions. For instance, the analytics server may train an artificial intelligence model to predict how the identified user interface controls should be ranked or otherwise provided to the user. The prediction may be based on historical data and/or user-specific data. For instance, based on the user's demographic data, type of merchant website, and the like. For instance, the artificial intelligence model may determine that when the user inputs "make my favorite list thicker," the user intends to change the thickness of the portion of his website that displays top selling items.

Figure 7A:
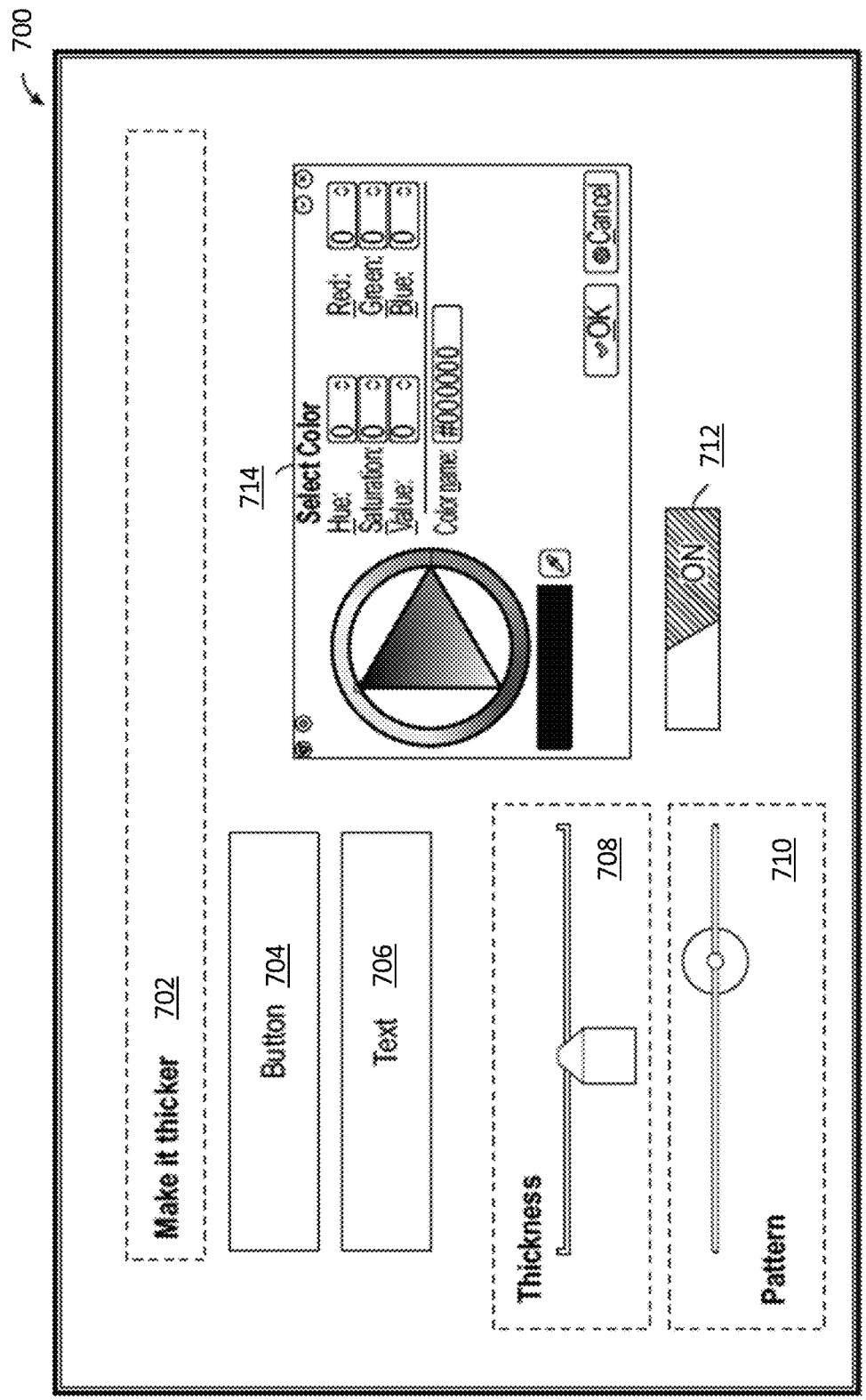
FIGS. 7A-7B show embodiments of providing user interface controls, according to an embodiment.

Referring now to FIG. 7A, a non-limiting example of a user interface 700 according to the methods and systems discussed herein is presented. The user interface 700 may be displayed by the analytics server when a user indicates a desire to revise a user interface of a merchant website. The user interface 700 may include a search bar 702 with which the user can input his desired user interface revisions in natural language. The user uses the search bar 702 to input "make it thicker." As a result, the analytics server uses the methods discussed herein to determine two user interface controls. Accordingly, the analytics server displays the graphical indicators 704 and 706 corresponding to different user interface controls (buttons user interface control and text user interface control respectively). Moreover, the graphical indicator 704 (button) is displayed on top of the graphical indicator 706, which indicates that the analytics server has determined that the user's input is more relevant to the button's user interface control.

The graphical indicators 704 and 706 may be interactive. In some other embodiments, such as the depicted example, the analytics server may directly display input elements corresponding to the graphical indicator interacted by the user. For instance, when the user clicks on (or otherwise interacts with) the graphical indicator 706, the analytics server displays the input elements 708-714 that revise the text of the user's website. The input element 710 is a slider that revises the thickness of the text, the input element 712 is a slider that revises the pattern associated with the text (whether the text is shown in solid lines, dashed lines, or other patterns), the input element 714 is a color input element that revises the color of the text, and the input element 712 turns the text on or off, such that the user can view the website without text.

Optionally, the analytics server may direct the user interface 700 to another page if/when the user interacts with the graphical indicators 704 and/or 706. For instance, when the analytics server determines that the user has interacted with the graphical indicator 706 ("text"), the analytics server may direct the user to a secondary page (sometimes hosted by another entity) that includes various (sometimes additional) input elements associated with revising the text.

The analytics server may monitor the user's inputs/interactions with the input elements displayed on the user interface 700 and may transmit the user's input to a web server, such that the web server can implement the changes instructed by the user. The analytics server may also monitor how the user interacts with various elements of the user interface 700 and generate the feedback discussed herein. As a result, the analytics server may improve its prediction (e.g., using computer model 530 of FIG. 5) regarding which user interface control is intended by the user. For instance, the analytics server initially predicted that the user intended to revise the boxes of the merchant website. However, the user interacted with the text user interface control instead. Therefore, this information can be used to improve the artificial intelligence model that made the initial prediction.

Figure 7B:
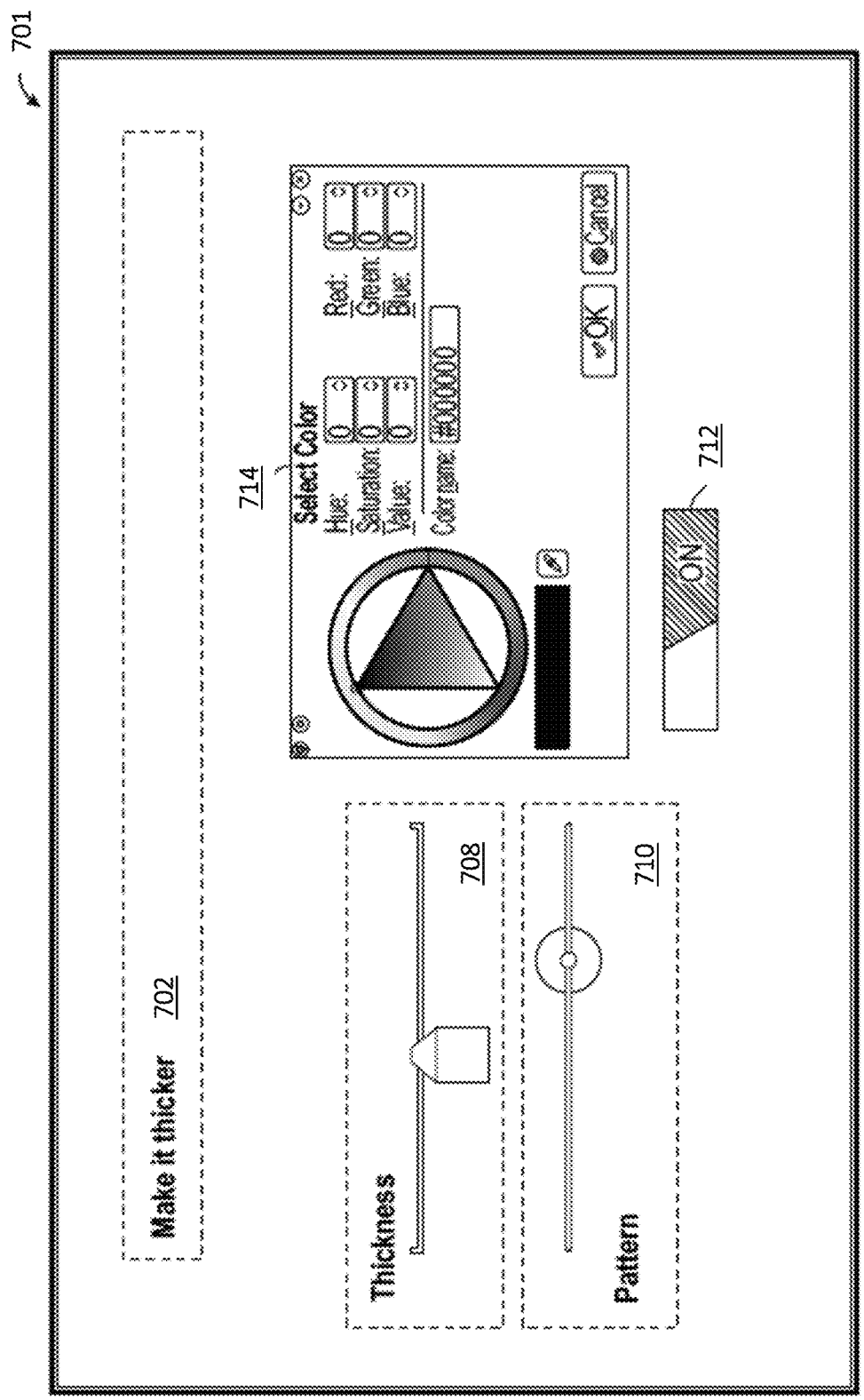

The analytics server may only present input elements that are determined to be pertinent to the user's intended revision. As depicted in FIG. 7B, the analytics server may display the user interface 701. In this embodiment, in response to the search query in the search bar 702, the analytics server may provide a response that displays the input elements 708, 710, 712, and 714, which are deemed as responsive and relevant to the search query by the analytics server, such that the user may directly interact with the displayed input elements. The input elements 708-714 may be similar to the input elements depicted in FIG. 7A and may provide the same functionality. In this configuration, the user interface 701 may not include the graphical indicators 704-706, and the user can directly adjust the input element(s) based on the desired change to the settings.

The analytics server may also monitor the user's inputs/interactions with the input elements displayed on the user interface 701 and may transmit the user's input to a web server, such that the web server can implement the changes instructed by the user. The analytics server may also monitor how the user interacts with various input elements of the user interface 701 and generate the feedback discussed herein. For instance, the analytics server may determine that the user did not interact with the input element 714 (revising the color). The analytics server may also determine that other users (with similar inputs as "make it thicker") did not interact with input elements that are configured to revise a user interface's text color. Therefore, the analytics server may re-train the artificial intelligence model (e.g., computer model 530 of FIG. 5), such that the input element 714 is no longer predicted (or predicted but is designated as less likely to be relevant) when a user inputs "make it thicker" (or any other semantically similar input).

In an embodiment, a computer-implemented method comprises receiving, by a processor via a search input element, an input; generating, by the processor, an input vector corresponding to the input; identifying, by the processor, a set of user interface controls matching the input, the identifying including comparing the input vector to a set of user interface control vectors; and providing, by the processor, the matching set of interactive user interface controls for presentation on a single user interface page.

The method may further comprise predicting, by the processor using an artificial intelligence model, the intent or the input vector.

The method may further comprise training, by the processor, the artificial intelligence model using a selection of at least one user interface control within the displayed set of user interface controls.

Providing the matching set of interactive user interface controls may comprise arranging, by the processor, the matching set of user interface controls based on a distance between the input vector and the set of user interface control vectors.

The method may further comprise instructing, by the processor, a server to revise the user interface in accordance with the input or the input vector.

The method may further comprise displaying, by the processor, a current value of the user interface parameter.

The input vector may indicate an intent associated with the input.

The set of user interface control vectors may correspond to the set of user interface controls.

In another embodiment, a non-transitory machine-readable storage medium may have computer-executable instructions stored thereon that, when executed by one or more processors, cause the one or more processors to perform operations comprising receive, via a search input element, an input; generate an input vector corresponding to the input; identify a set of user interface controls matching the input, the identifying including comparing the input vector to a set of user interface control vectors; and provide the matching set of interactive user interface controls for presentation on a single user interface page.

The computer-executable instructions may further cause the one or more processor to predict, using an artificial intelligence model, the intent or the input vector.

The computer-executable instructions may further cause the one or more processor to train the artificial intelligence model using a selection of at least one user interface control within the displayed set of user interface controls.

Providing the matching set of interactive user interface controls comprises arranging, by the processor, the matching set of user interface controls based on a distance between the input vector and the set of user interface control vectors.

The computer-executable instructions may further cause the one or more processor to instruct a server to revise the user interface parameter in accordance with the input or the input vector.

The computer-executable instructions may further cause the one or more processor to display a current value of the user interface parameter.

The input vector may indicate an intent associated with the input.

The set of user interface control vectors may correspond to the set of user interface controls.

In another embodiment, a computer system may comprise a computing device; a server in communication with the computing device, the server configured to receive, via a search input element, an input; generate an input vector corresponding to the input; identify a set of user interface controls matching the input, the identifying including comparing the input vector to a set of user interface control vectors; and provide the matching set of interactive user interface controls for presentation on a single user interface page.

The server may be further configured to predict, using an artificial intelligence model, the intent or the input vector.

The server may be further configured to train the artificial intelligence model using a selection of at least one user interface control within the displayed set of user interface controls.

Providing the matching set of interactive user interface controls may comprise arranging, by the processor, the matching set of user interface controls based on a distance between the input vector and the set of user interface control vectors.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What we claim is:

1. A computer-implemented method comprising:
   receiving, by a processor via a search input element, an input to adjust appearance of a user interface;
   generating, by the processor, an input vector corresponding to the input;
   identifying, by the processor, an existing set of user interface controls matching the input, the identifying including comparing the input vector to a set of user interface control vectors; and
   providing, by the processor, a set of interactive input elements representing the matching set of user interface controls configured to adjust appearance of the user interface for presentation on a single user interface page.

2. The method of claim 1, further comprising:
   predicting, by the processor using an artificial intelligence model, an intent of the input or the input vector.

3. The method of claim 2, further comprising:
   training, by the processor, the artificial intelligence model using a selection of at least one user interface control within the provided set of user interface controls.

4. The method of claim 1, wherein providing, by the processor, the matching set of user interface controls comprises arranging, by the processor, the matching set of user interface controls based on a distance between the input vector and the set of user interface control vectors.

5. The method of claim 1, further comprising:
   instructing, by the processor, a server to revise a user interface in accordance with the input or the input vector.

6. The method of claim 1, further comprising:
   displaying, by the processor, a current value of the user interface.

7. The method of claim 1, wherein the input vector indicates an intent associated with the input.

8. The method of claim 1, wherein the set of user interface control vectors corresponds to the set of user interface controls.

9. A non-transitory machine-readable storage medium having computer-executable instructions stored thereon that, when executed by one or more processors, cause the one or more processors to perform operations comprising:
   receive, via a search input element, an input to adjust appearance of a user interface;
   generate an input vector corresponding to the input;
   identify an existing set of user interface controls matching the input, the identifying including comparing the input vector to a set of user interface control vectors; and
   provide a set of interactive input elements representing the matching set of user interface controls configured to adjust appearance of the user interface for presentation on a single user interface page.

10. The non-transitory machine-readable storage medium of claim 9, wherein the computer-executable instructions further cause the one or more processors to predict, using an artificial intelligence model, an intent of the input or the input vector.

11. The non-transitory machine-readable storage medium of claim 10, wherein the computer-executable instructions further cause the one or more processors to train the artificial intelligence model using a selection of at least one user interface control within the provided set of user interface controls.

12. The non-transitory machine-readable storage medium of claim 9, wherein providing the matching set of user interface controls comprises arranging the matching set of user interface controls based on a distance between the input vector and the set of user interface control vectors.

13. The non-transitory machine-readable storage medium of claim 9, wherein the computer-executable instructions further cause the one or more processors to instruct a server to revise a user interface in accordance with the input or the input vector.

14. The non-transitory machine-readable storage medium of claim 9, wherein the computer-executable instructions further cause the one or more processors to display a current value of the user interface.

15. The non-transitory machine-readable storage medium of claim 9, wherein the input vector indicates an intent associated with the input.

16. The non-transitory machine-readable storage medium of claim 9, wherein the set of user interface control vectors corresponds to the set of user interface controls.

17. A computer system comprising:
   a computing device;
   a server in communication with the computing device, the server configured to:
      receive, via a search input element, an input to adjust appearance of a user interface;
      generate an input vector corresponding to the input;

identify an existing set of user interface controls matching the input, the identifying including comparing the input vector to a set of user interface control vectors; and provide a set of interactive input elements representing the matching set of user interface controls configured to adjust appearance of the user interface for presentation on a single user interface page.

18. The method of claim 17, wherein the server is further configured to predict, using an artificial intelligence model, an intent of the input or the input vector.

19. The method of claim 18, wherein the server is further configured to train the artificial intelligence model using a selection of at least one user interface control within the provided set of user interface controls.

20. The method of claim 17, wherein providing the matching set of user interface controls comprises arranging the matching set of user interface controls based on a distance between the input vector and the set of user interface control vectors.

* * * * *